(12) United States Patent
Jones et al.

(10) Patent No.: US 7,929,727 B2
(45) Date of Patent: Apr. 19, 2011

(54) METHODS FOR VISUALLY SEPARATING AN OBJECT FROM ITS BACKGROUND, METHODS FOR DETECTING A CAMOUFLAGED OBJECT AGAINST ITS BACKGROUND AND DETECTION APPARATUS EMBODYING SUCH METHODS

(75) Inventors: Peter W. J. Jones, Belmont, MA (US); Dennis W. Purcell, Medford, MA (US)

(73) Assignee: Tenebraex Corporation, Boston, MA (US)

( * ) Notice: Subject to any disclaimer, the term of this patent is extended or adjusted under 35 U.S.C. 154(b) by 767 days.

(21) Appl. No.: 10/627,544

(22) Filed: Jul. 25, 2003

(65) Prior Publication Data

US 2004/0135881 A1    Jul. 15, 2004

Related U.S. Application Data

(60) Provisional application No. 60/398,703, filed on Jul. 26, 2002.

(51) Int. Cl.
G06K 9/00 (2006.01)
H04N 5/225 (2006.01)

(52) U.S. Cl. .................. 382/103; 348/342
(58) Field of Classification Search .............. 382/103; 348/342
See application file for complete search history.

(56) References Cited

U.S. PATENT DOCUMENTS

| | | | | |
|---|---|---|---|---|
| 3,602,573 A | * | 8/1971 | Kermode | 359/502 |
| 3,737,239 A | * | 6/1973 | Adams et al. | 356/406 |
| 3,841,734 A | * | 10/1974 | Kermode | 359/578 |
| 5,132,802 A | * | 7/1992 | Osthues et al. | 348/262 |
| 5,452,089 A | * | 9/1995 | Bushman | 356/364 |
| 5,940,183 A | * | 8/1999 | Miller | 356/418 |
| 6,646,799 B1 | * | 11/2003 | Korniski et al. | 359/407 |
| 2002/0067560 A1 | * | 6/2002 | Jones | 359/885 |

OTHER PUBLICATIONS

Withagen et al.; "Band selection from a hyperspectral data-cube for a real-time multispectral 3CCD camera", Algorithms for Multispectral, Hyperspectral, and Ultraspectral Imagery VII, SPIE vol. 4381, 2001.*

Witherspoon et al.; "The Coastal Battlefield Reconnaissance and Analysis (COBRA) Program for Minefield Detection", SPIE vol. 2496, 1995.*

* cited by examiner

*Primary Examiner* — John B Strege
(74) *Attorney, Agent, or Firm* — Edwards Angell Palmer & Dodge LLP; Peter F. Corless; Lisa Swiszcz (57) ABSTRACT

Featured is an apparatus and method for detecting an object (e.g., human, man-made object) from its background, which object may be camouflaged so as to blend the object with the background. In its broadest aspects the detecting method includes viewing an area while selectively and varyingly changing a sensitivity of a viewing device to certain wavelengths of light lying in any one of the ultraviolet (UV) range, the visible range or the near and/or far infrared and determining the presence of an object when a visual difference between the object and background is discerned when the sensitivity of the viewing device is changed to a certain mixture of wavelengths of light. The method further includes determining the presence of an object when a visual difference is observed between the object and the background and no discernable difference is observed one sensitivity of the viewing device is changed to least another mixture of wavelengths.

16 Claims, 8 Drawing Sheets

METHODS FOR VISUALLY SEPARATING AN OBJECT FROM ITS BACKGROUND, METHODS FOR DETECTING A CAMOUFLAGED OBJECT AGAINST ITS BACKGROUND AND DETECTION APPARATUS EMBODYING SUCH METHODS

This application claims the benefit of U.S. Provisional Application No. 60/398,703 filed, Jul. 26, 2002, all of which applicants incorporated herein by reference in their entirety.

FIELD OF INVENTION

The present invention generally relates to methods to detect an object, such as a person, animal or inanimate object (e.g., vehicle) from its background and apparatus employing an electro-optical device being configured to detect such an object and more particularly methods and apparatus using a varying spectral input to detect an object that is being camouflaged.

BACKGROUND OF THE INVENTION

There has been a long tradition, particularly with respect to warfare, of hiding a person(s) and/or equipment so that the person(s) and/or equipment blend visually into their natural surroundings. The term typically usually used to describe this process is camouflaging. In the context of warfare, camouflage makes it difficult for troops to detect offensive threats to them and/or to identify prospective targets (e.g., artillery, aircraft or land forces) to attack using any of a number of available means. If the attacking forces or other threats (e.g., armored vehicles) can remain hidden because of the camouflaging, this gives the attacking forces or other threats a great, and dangerous, advantage.

This camouflaging process is often done by covering the object (i.e., person or equipment) to be camouflaged with a material that is designed to match the color, lightness/darkness (value) and/or pattern of the surrounding area. For example, to hide a person in a forested area, the person would be covered with a material that matches the green and brown colors of the surround foliage and branches. Traditionally, the materials used for camouflaging have been designed to merge with their surrounding background when seen by a human eye with light in the visible range: approximately 400 to 700 nm.

The military has made increasing use of electro-optical devices of various types to improve its ability to maintain visual awareness of the battlefield in conditions where the ability to observe with the human eye is degraded, such as at night or when agents (e.g., smoke) obscure vision. The increasing use of electro-optic devices such as night vision and thermal sights, that can see outside the visible light range into the infrared or ultraviolet, has consequently lead to camouflage becoming more sophisticated. Modern camouflage materials generally can mimic their surroundings when seen in the visible light range, and also in the IR and/or UV range.

For example, night vision devices in addition to being sensitive to visible light, are typically also sensitive to near-infrared light out to about 900 nm. Most living plant leaves found in forests are highly reflective in the near IR range, even if they appear dark green in the visible light range. In order to mimic this forest environment, modern forest camouflage material is made to not only match the color of green leaves in the visible range, but also to be highly reflective in the near IR range. In this way, the camouflage material will match the surrounding foliage when seen with a night vision device, i.e., both will appear as a similar light value in the display of the night vision device.

When trying to protect fixed sites, other electro-optical devices may be used to try to detect offensive forces or enemy troops or other threats. Such other electro-optical devices can include surveillance video cameras, both black & white and color. Again, if an electro-optical device has a full-color output, such as CCD camera or a color night vision device, a well-designed modern camouflage material may still match its natural background both when seen by visible light, or the combination of visible and UV and/or IR light.

The existing methods of detecting camouflaged personnel and equipment generally involve training and deploying troops using magnified optics such as binoculars and spotting scopes to slowly and closely visually examine an area such as the area surrounding a fixed site (e.g., an air base). In view of the many challenges posed, such as the size of a perimeter to be protected and the effectiveness of modern camouflage materials and techniques, it is difficult to visually scan an area and detect hidden offensive forces and/or camouflaged equipment. In addition to magnified optics, electro-optical viewing devices that see into the thermal range (e.g., in the range of 8 to 10 micron) are used to detect thermal emissions from the area being viewed, however, such thermal sights are susceptible to being fooled by well-designed thermal camouflage. Furthermore, such thermal sights are very expensive.

In addition, there are cases where the object is not camouflaged but rather the color of the object blends to a certain degree with the background in the visual light spectrum. Thus, police and search agencies as well as the military are unable to easily locate these objects even though the object was not specifically camouflaged for purposes of hiding the object in the background such as a forest. For example, a missing vehicle such as a car or truck sought by the police or non-camouflaged military vehicles could be driven into a densely packed area of trees or brush where the color of the vehicle (e.g., a green color) is such that it blends to some degree with the surrounding foliage making the vehicle difficult to see with the naked eye. In addition, the vehicle color also may contain pigments that would make the vehicle have approximately the same reflectivity of the surrounding foliage in the near IR so that the vehicle would appear to be part of the foliage.

It thus would be desirable to provide a new device for detecting the presence of objects including camouflaged objects (e.g., personnel or equipment) and new methods for detecting such objects. It would be particularly desirable to provide such a device and method whereby the object can be visually separated from its surroundings or background. It also would be particularly desirable to provide such a device and method whereby such visual separation from the background can be achieved using devices that would be simple in construction and less costly than prior art devices and such methods would not require highly skilled users to utilize the device.

SUMMARY OF THE INVENTION

The present invention features methods for detecting objects from the background and apparatus embodying such methods for detecting objects. Such objects include humans, animals, natural objects and artificial or man-made objects, which objects may be camouflaged so as to blend the object with the background or not camouflaged. It should be recognized that the methodology is particularly suited for detecting camouflaged objects against the background the camouflaged object is located in, such as wooded areas, a forest, field or an area that includes a mixture of foliage. In its broadest aspects a method for detecting objects using a viewing device from its background according to the present invention includes viewing an area or region while selectively and variably changing the sensitivity of the viewing device to certain wavelengths of light or electromagnetic radiation lying in any one of the ultraviolet (UV) range, the visible range or the infrared (i.e., including the near and far infrared). More particularly, such selectively and variably changing includes selectively and variably adding or blocking the sensitivity of the viewing device to certain wavelengths of light. The method also includes determining the presence of an object when a visual difference between the object and background is discerned (e.g., a difference in color for color or false color sensing devices or tone for monochromatic sensing devices) when the sensitivity of the viewing device is changed to a certain mixture of wavelengths of light. The method also further comprises determining the presence of an object by discerning a visual difference between the object and the background and by observing that there is no discernable difference between the object and the background when the sensitivity of the viewing device is changed to at least another mixture of wavelengths of light.

Although artificial camouflage materials (e.g., the pigments) more specifically modern camouflage materials can do a surprisingly good job at generally matching their surroundings over a wide range of the electromagnetic spectrum (e.g., visual and near infrared), such materials often cannot match the reflectance at all points spectrally of the background or surroundings. Thus, because the camouflaged material cannot match its background at all points spectrally, by selectively and variably changing the sensitivity of the viewing device to certain wavelengths of light while observing an area; spectral difference between a camouflaged object and its background can be observed allowing an observer to identify the general location of the camouflaged object. In other words, for at least one of the changes in sensitivity of the viewing device, the camouflaged object should present a different visual image either in color or tonality than that of the its surrounding background although this different visual image may not be observed in other of the changes in the sensitivity of the dealing device. In this way, an observer can detect the camouflaged object irrespective that the spectral characteristics of the camouflage material generally mimic the surrounding background.

Similarly, with a non-camouflaged object whose color is such that it blends visually with its background or surroundings or matches its surroundings in some ranges of the electromagnetic spectrum (e.g., visual and near infrared), it is likely that the pigments cannot match the reflectance at all spectral points of the background or surroundings. Thus, by viewing an area while selectively and variably changing the sensitivity of the viewing device to certain wavelengths of light, the observer can discern or separate the object from its background or surroundings by color or tonality (i.e., see a visual difference between object an background).

A detection method according to an aspect of the present invention more particularly includes viewing an area with a viewing device in the visual spectrum and also viewing this area while selectively and variably changing the sensitivity of the viewing device to certain wavelengths of light in one of the UV range or IR range. The method also includes determining the presence of an object when a visual difference between the object and background is discerned (e.g., a difference in color for color or false color sensing devices or tonal difference for monochromatic sensing devices) when the sensitivity of the viewing device is changed to a certain mixture of wavelengths of light. The method also further comprises determining the presence of an object by discerning a visual difference between the object and the background and by observing that there is no discernable difference between the object and the background when the sensitivity of the viewing device is changed to at least another mixture of wavelengths of light.

In more specific embodiments, the method further includes dividing at least a portion of the UV spectral region or the IR spectral region into one or more viewing bandpasses, more particularly a plurality or more of viewing bandpasses, each viewing bandpass having a predetermined band width. Also, said viewing the area while selectively and variably changing includes viewing the area in the visual light spectrum and in each of the one or more viewing bandpasses. More specifically, the observer successively views the area in said each of the one or more viewing bandpasses. In this way, the observer views the area in the visual spectral region in addition to each of the one or more viewing bandpasses so as to accentuate changes in color or tone between the object and the background. The observer thus can determine the presence of an object when a visual difference between the object and the background is seen while viewing the area in the visual light spectrum while being mixed with any one of the one or more viewing bandpasses.

The bandwidth of each of the plurality or more of viewing bandpasses is generally established so the width of each bandpass is narrow enough so as to minimize contributions from other spectral regions that would tend to mask the spectral or visual difference between the object and its background yet wide enough to pass enough light/energy so as to make a difference in the display of the viewing device. In exemplary embodiments, each viewing bandpass has a bandwidth of about 100 nm or less, 50 nm or less, 20 nm or less, about 20 nm, in the range of from about 20 nm to about 100 nm, in the range of from about 20 to about 50 nm. It also is within the scope of the present invention for the one or more plurality of viewing bandpasses to be arranged so that they have different bandwidths (e.g., one bandwidth of 20 nm and another of 30 nm).

It also is within the scope of the present invention to divide "the at least a portion" of the UV spectral region or the IR spectral region into a plurality or more of viewing bandpasses that do not cover the entire spectral region of "the at least a portion" (i.e., the viewing bandpasses in total cover a band width that is smaller than the band width of "the at least a portion"). In addition, it is within the scope of the present invention to divide the spectral region comprising UV, near infrared or far infrared electromagnetic radiation into a plurality or more viewing bandpasses. Further, it is within the scope of the present invention for one or more of the viewing bandpass to be arranged so as to overlap a portion of an adjacent viewing bandpass or for one or more of the viewing bandpasses to be contiguous with an adjacent viewing bandpass (i.e., bandpasses with common boundaries). The foregoing is exemplary as any of a number of techniques for dividing the at least a portion into discrete viewing bandpasses and for arranging such bandpasses are contemplated for use in the present invention.

The present invention also features apparatus and devices for detecting an object from its background or surroundings including an electro-optical device and a mechanism for selectively and varyingly changing the optical input to the electro-optical device. The electro-optical device includes any of a number of devices known to those skilled in the art capable of sensing electromagnetic radiation in at least one of the UV spectral region, the visual spectral region or the IR (near infrared and/or far infrared). In more particular embodiments, the electro-optical device senses electromagnetic radiation in the visual spectral region and at least a portion of one of the UV or IR spectral regions. In a more specific embodiment, the electro-optical device senses electromagnetic radiation in the visual spectral region and at least a portion of UV spectral region and IR spectral region.

In further embodiments, the electro-optical device generally includes monochromatic and color imaging devices, such as for example IR sensitive night vision devices, CCD sensors, CCD cameras, and far infrared thermal sensors. Also contemplated for use with the present invention is a color imaging device embodying a monochromatic night vision device as found in U.S. Ser. No. 09/791,416, the teachings of which are incorporated herein by reference.

The mechanism for selectively and varyingly changing the optical input to the electro-optical device comprises any one of a number of devices known to those skilled in the art, by which the optical input to the electro-optical device can be tuned such that an amount of light from outside the normal visible light range, more particularly the UV and IR spectral regions, in each of one or more predetermined pass bands, for a long wave pass band filter, a short wave pass band filter or a bandpass filter as is known to those skilled in the art, is successively and separately added into its image-forming sensitivity. In other words, the mechanism successively varies the predetermined pass bands so the amount of light being added corresponds to different portions of the IR or UV spectral region. See also the discussion above regarding the dividing of the at least a portion of the IR and UV spectral regions for further details as to the width and arrangement of the separate pass bands.

In particular embodiments, the mechanism for selectively and varyingly changing the optical input includes any of a number of discrete or continuous filters known to those skilled in the art that progressively passes longer and longer or shorter and shorter wavelength light as the filter is rotated, shifted or tilted, in the case of a reflective filter, in front of an imaging sensor of the electro-optical device. In more specific embodiments, the filter is located in front of the converging lens or focusing optical element of the electro-optical device or between the converging lens and the imaging sensor of the electro-optical device. More specifically, the filter is one of a variable low-pass, variable high-pass or bandpass filters as is known to those skilled in the art.

In even more particular embodiments, the apparatus of the present invention is configured and arranged so that a plurality or more of filters are located in front of the imaging sensor of the electro-optical device, the filters having a wide pass band. For example, one filter is configured and arranged to pass visible light plus a variable cut-off point of IR light and the other filter is configured and arranged to pass visible light plus a variable cut-off point of UV light.

In an exemplary embodiment, the filter is a variable short-wave-pass (high pass) IR blocking filter that is made up of a plurality or more of filter segments. In one specific embodiment the segments are arranged radially about a center of the filter and the filter is rotated in front of the imaging sensor of the electro-optical device. In another specific embodiment, the filter segments are arranged longitudinally on a sliding filter, and the filter is slide along an axis in front of the imaging sensor. Each of the segments is configured and arranged such that a following segment has a cut-off point that is at a longer wavelength than the segment preceding it the travel direction (e.g., a counterclockwise or clockwise direction for a filter that is rotated).

The present invention also features a color electro-optic device that is configurable such that a tunable amount of light from outside the normal visible light range is added into its image-forming sensitivity, thereby forming a variable "false color" device. A variable variable false color device is particularly advantageous because it would make it relatively easier to detect an object than in the case where an electro-optical device with a set range of sensitivity is used. If the fixed set of sensitivities becomes known to a foe, that foe can use the information to design a camouflage material that can hide from such an electro-optical device. If, however, the sensitivities are variable, it becomes extremely difficult if not impossible to design a camouflage material that remains hidden at all mixtures of wavelengths of light.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

As indicated above, the present invention features methods for detecting an object from its background or surroundings as well an apparatus embodying such methods for detecting objects. Such objects include, but are not limited to humans, animals and artificial or man-made objects, which objects may be camouflaged so as to blend the object with the background or not camouflaged. It should be recognized that the methodology of the present invention is particularly suited for detecting camouflaged objects from the background or surroundings the camouflaged object is located in, such as wooded areas, a forest, field or an area that includes a mixture of foliage.

In its broadest aspects a method for detecting objects from its background using a viewing device includes viewing an area or region while selectively and variably changing the sensitivity of the viewing device to certain wavelengths of light or electromagnetic radiation lying in any one of the ultraviolet (UV) range, the visible range or the infrared (i.e., including the near and far infrared). More particularly, such selectively and variably changing includes selectively and variably adding or blocking the sensitivity of the viewing device to certain wavelengths of light. The method also includes determining the presence of an object when a visual difference between the object and background is discerned (e.g., a difference in color for color or false color sensing devices or tone for monochromatic sensing devices) when the sensitivity of the viewing device is changed to a certain mixture of wavelengths of light. The method also further comprises determining the presence of an object by discerning a visual difference between the object and the background and by observing that there is no discernable difference between the object and the background when the sensitivity of the viewing device is changed to at least another mixture of wavelengths of light.

Figure 1:
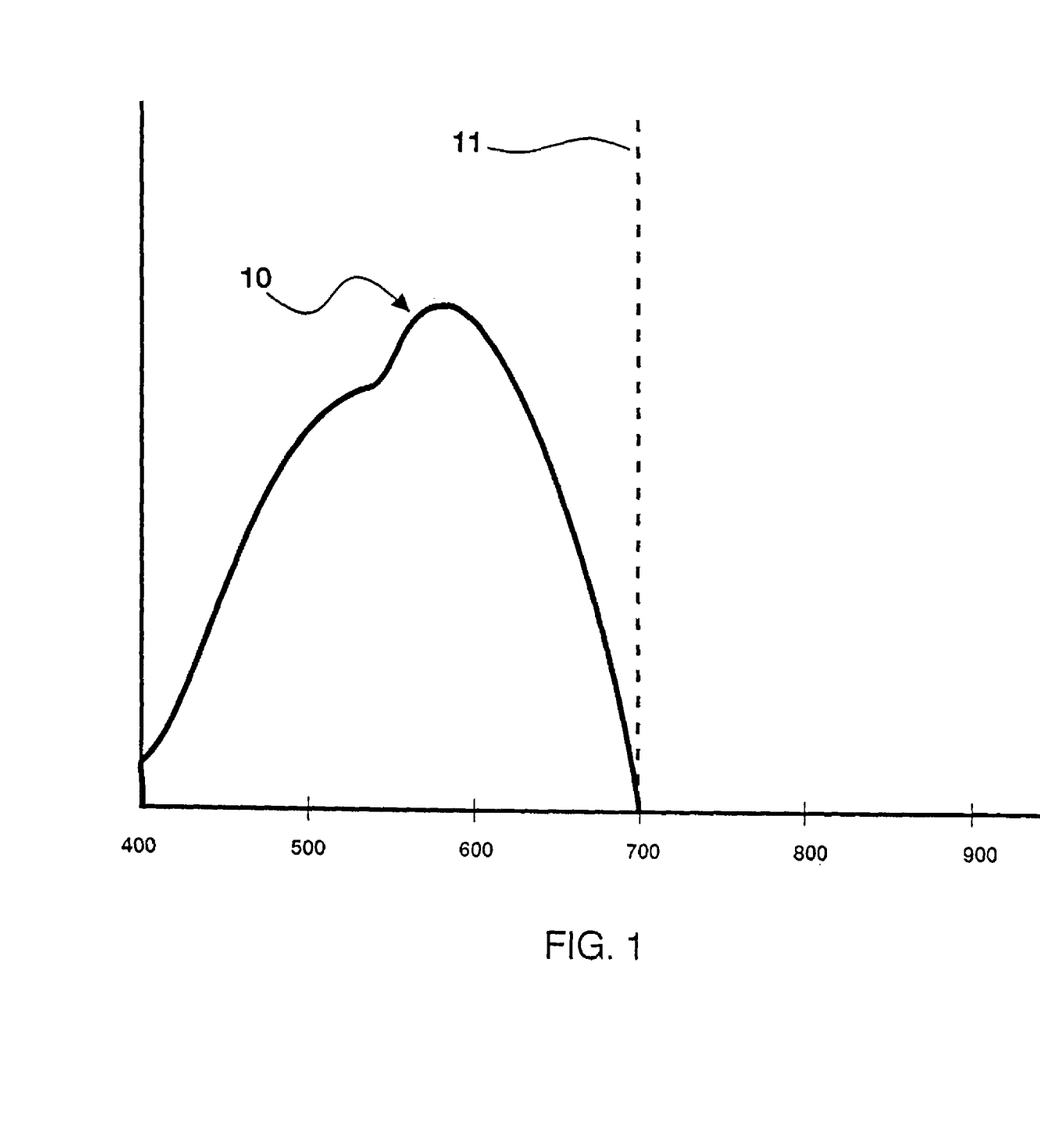
FIG. 1 is an illustration of the sensitivity as a function of wavelength of a human eye to light.
Figure 2:
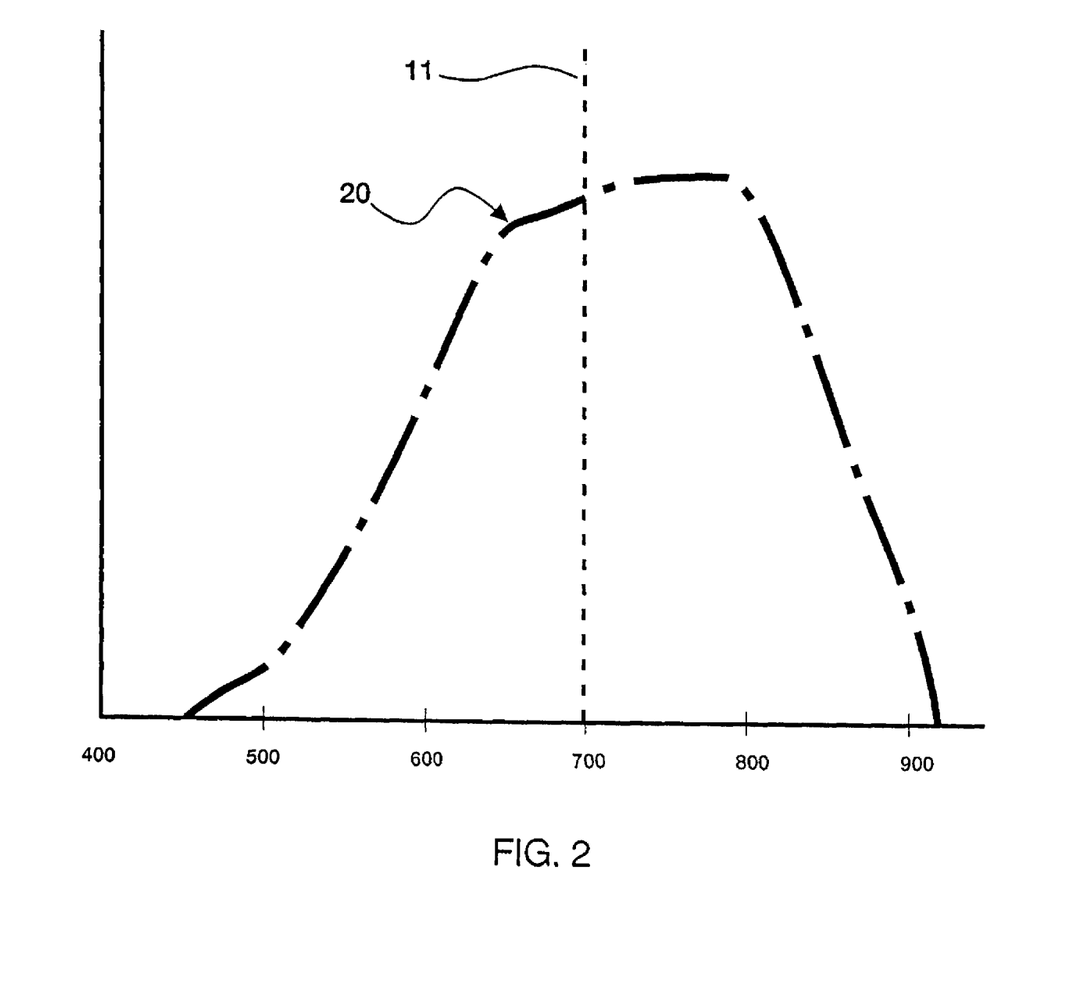
FIG. 2 is an illustration of the sensitivity as a function of wavelength of an exemplary night vision device.
Figure 3:
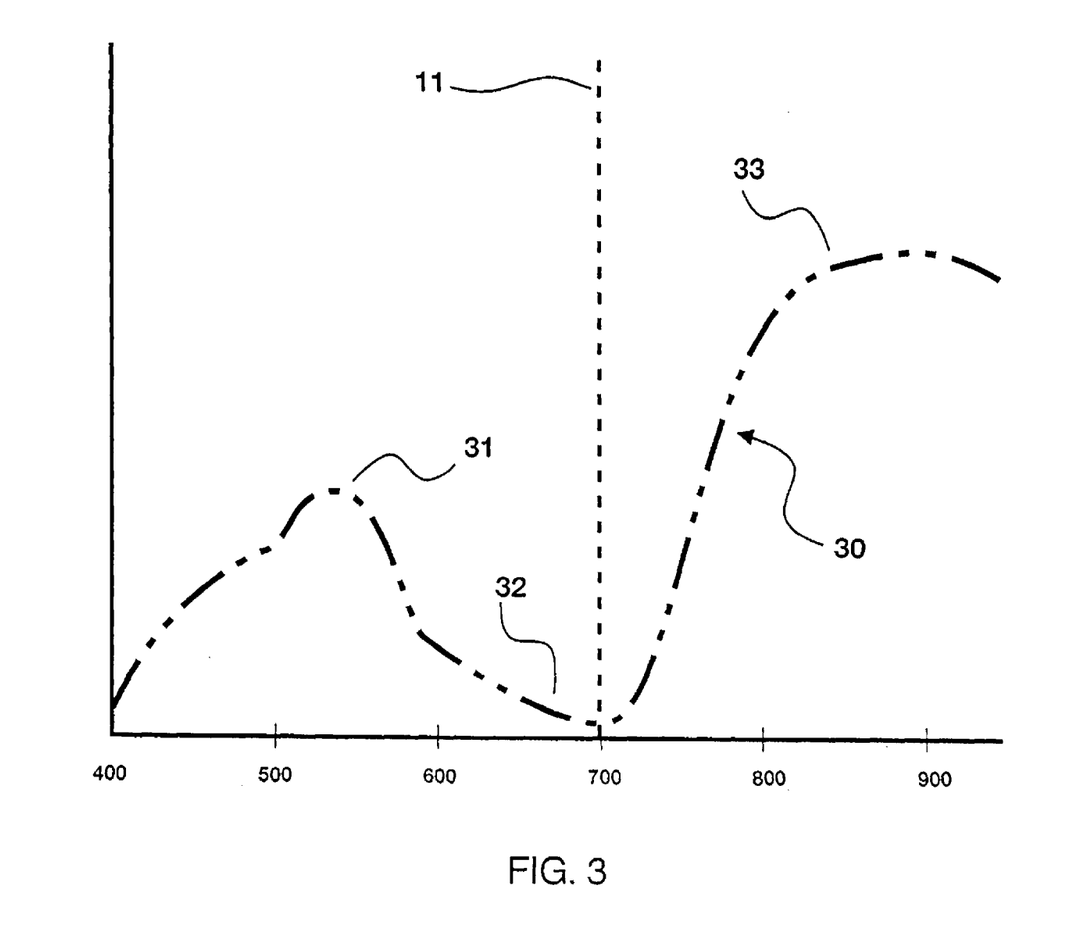
FIG. 3 is an illustration of the reflectance as a function of wavelength of foliage.

Before describing the methodology and apparatus of the present invention, first is described the spectral characteristics of a human eye (FIG. 1), an exemplary night vision device (FIG. 2), and foliage (FIG. 3). As shown diagrammatically by the sensitivity curve 10 in FIG. 1, the human eye is sensitive to light or electromagnetic radiation with a range of wavelengths from approximately 400 nm (blue/violet) to 700 nm (red). Hereinafter, this range of wavelengths is referred to as the visible spectral range or visible spectrum. The line 11 marks a border between the visible spectrum and the near infrared (IR), which lies at approximately 700 nm.

As shown diagrammatically by the sensitivity curve 20 in FIG. 2 for an exemplary Gen. III night vision device, such a device typically has a spectral sensitivity in the range of from about 500 nm to 900 nm. This means that the night vision device is sensitive to light or electromagnetic radiation into the near infrared range (i.e., wavelengths larger than about 700 nm).

Referring now to FIG. 3, there is shown a reflectance curve 30 illustrating the reflectance exhibited by foliage. As shown in the reflectance curve 30, at point 31 living foliage typically is relatively reflective of green light and, at point 32, the foliage is less reflective of red light. The human eye and brain interpret this condition as a green color; and thus foliage appears green to the naked eye. As also shown in FIG. 3, the foliage becomes highly reflective at point 33 in near infrared, starting just beyond 700 nm. Because the human eye is not sensitive to light with wavelengths longer than 700 nm, human eyes do not see this reflected infrared light. Consequently, the living foliage still seems green to the naked eye.

Figure 4:
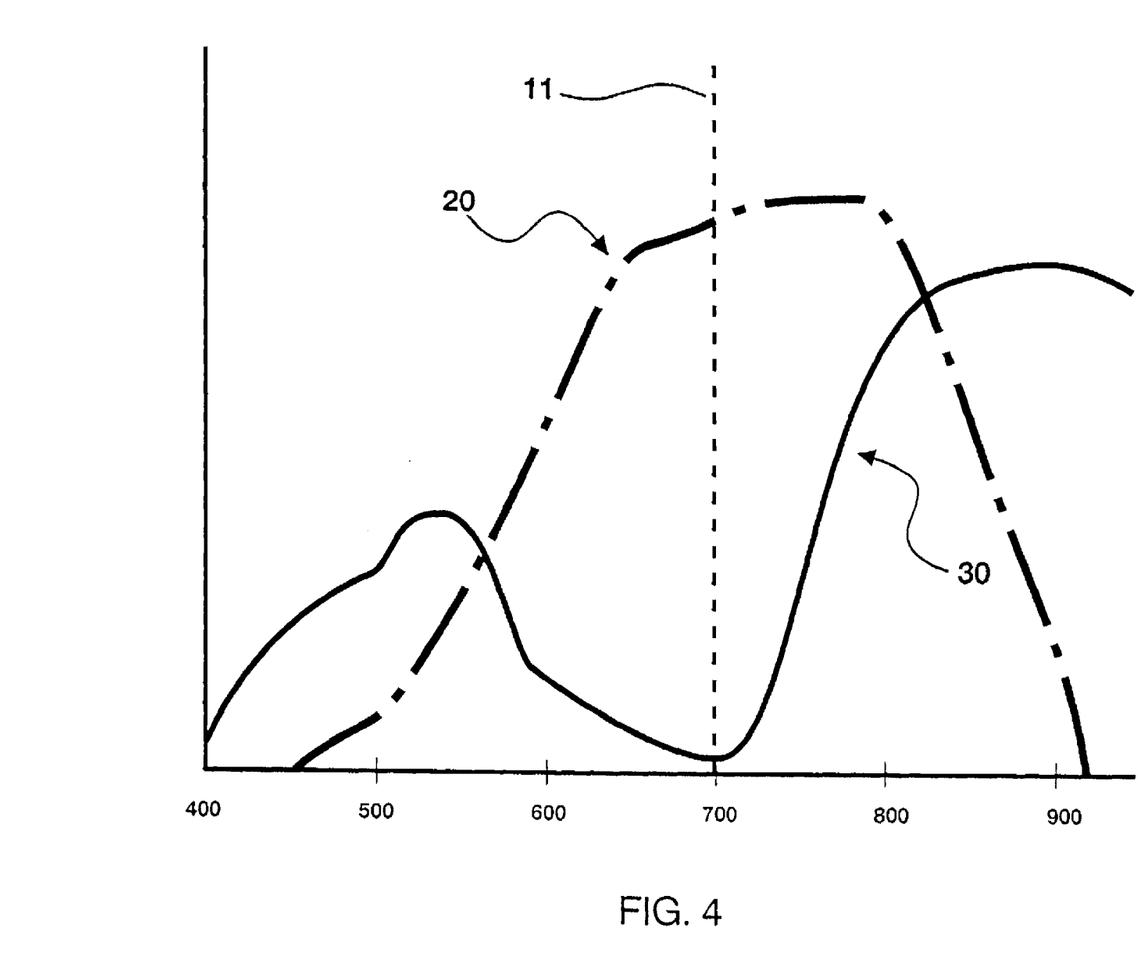
FIG. 4 is an illustration showing the spectral relation between the reflectance of foliage and the sensitivity of the exemplary night vision device.

As indicated above, an exemplary Gen. III night vision device typically has a spectral sensitivity in the range of from about 500 nm to 900 nm. Thus, and as more clearly shown in FIG. 4 (a compilation of FIGS. 2 & 3), such a night vision device can see a large amount of near infrared light that is reflected by foliage. If the night vision device is configured with a monochromatic display, then the foliage appears or is seen in the display as white or a very light gray, or green if the display is a monochromatic green type of display. If the night vision device has a color output and, as is typically done assigns long-wavelength light to the red output in a two or three color display, then the foliage will appear or be seen in the display as having a red color.

It can be seen from the foregoing that if the color of an object in the visible spectrum is similar to that for foliage (e.g., green) then to the naked eye the object will appear to blend in and be a part of the foliage. Also, if the pigments comprising the color of the object exhibit high reflectivity in the near infrared, then the object will appear light in tone or red when viewed through the exemplary night vision device as does the foliage. Consequently, the object will blend into the foliage and not be easily discerned by the naked eye or when using a night vision device.

For objects covered by modern camouflage materials, certain color pigments are utilized because they exhibit high reflectivity in the near infrared and because the color in the visible spectrum is appropriate for the background or surroundings the object is in (e.g., the pigments are green in color for foliage). Consequently, the camouflage material will exhibit the desired coloration (e.g., green) to the naked eye when seen in daylight in the visible range (about 400-700 nm) as well as appearing the same visually as the background/surroundings (e.g., light or red for foliage) when seen through a night vision device. Thus, the camouflaged object will appear to match its surroundings/background in daylight or when viewed through a night vision device and thus not easily noticed by the observer.

Figure 5:
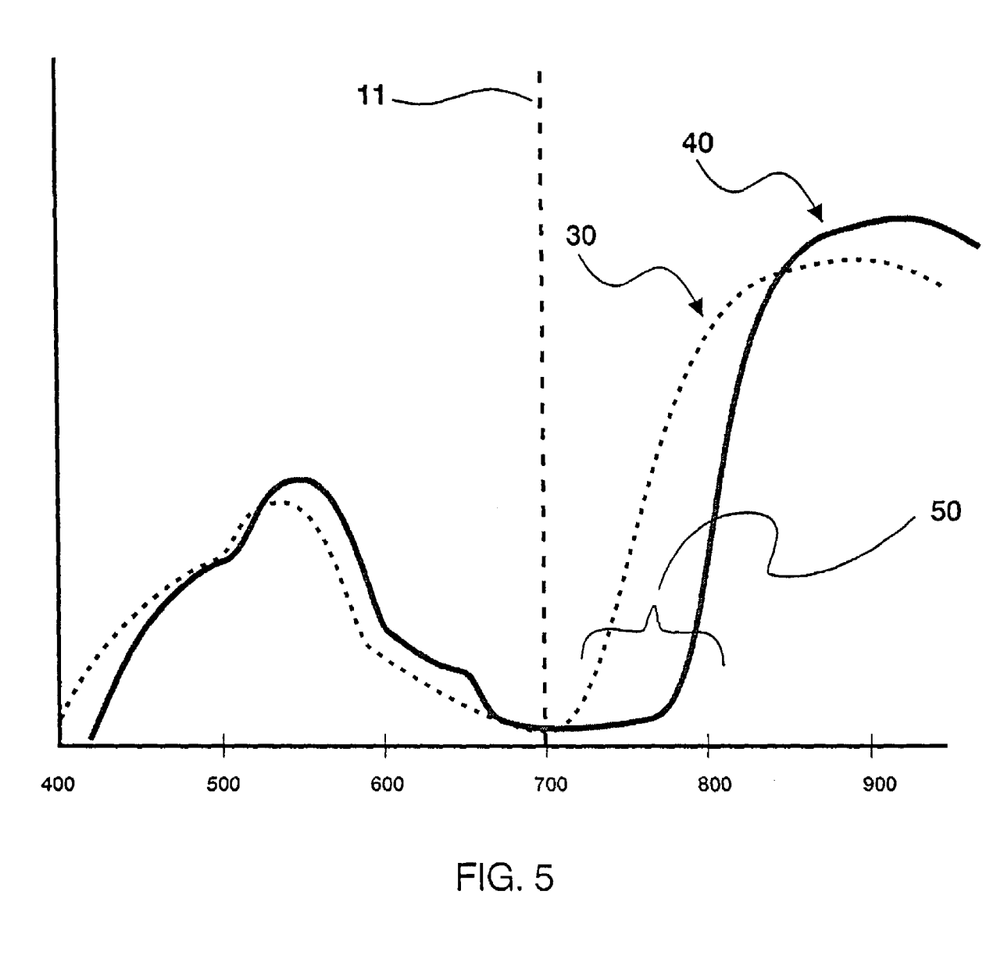
FIG. 5 is an illustration showing comparing reflectance of foliage and that of an exemplary camouflage material as a function of wavelength.

Although the color of the object or the camouflaged material covering or obscuring the object may in gross appear to match its surroundings or background, it is difficult if not impossible for the reflectivity of the pigments to match the reflectance of a natural background material, such as foliage, at every point in the spectrum. For example, and with reference to FIG. 5, there is shown a typical reflectance curve 30 for foliage and a reflectance curve 40 for a pigment used in an exemplary modern camouflage material. As can be seen from a comparison of these two curves, the reflectance curve 40 for the camouflage material pigment is similar to, but not exactly the same as, the reflectance curve 30 for the foliage. When an area including such camouflage materials and foliage is viewed by the naked eye during daylight or by means of a night vision device, the camouflage material pigment(s) do a fairly good job of matching the background foliage. This occurs even though there is a gap 50 between where the foliage curve 30 starts to be reflective of near infrared light and where the camouflage material pigment curve 40 starts to be reflective, because the naked eye cannot perceive this gap 50 and the reflective portions in the near infrared will tend to mask the gap when viewed through a night vision device.

Figure 6:
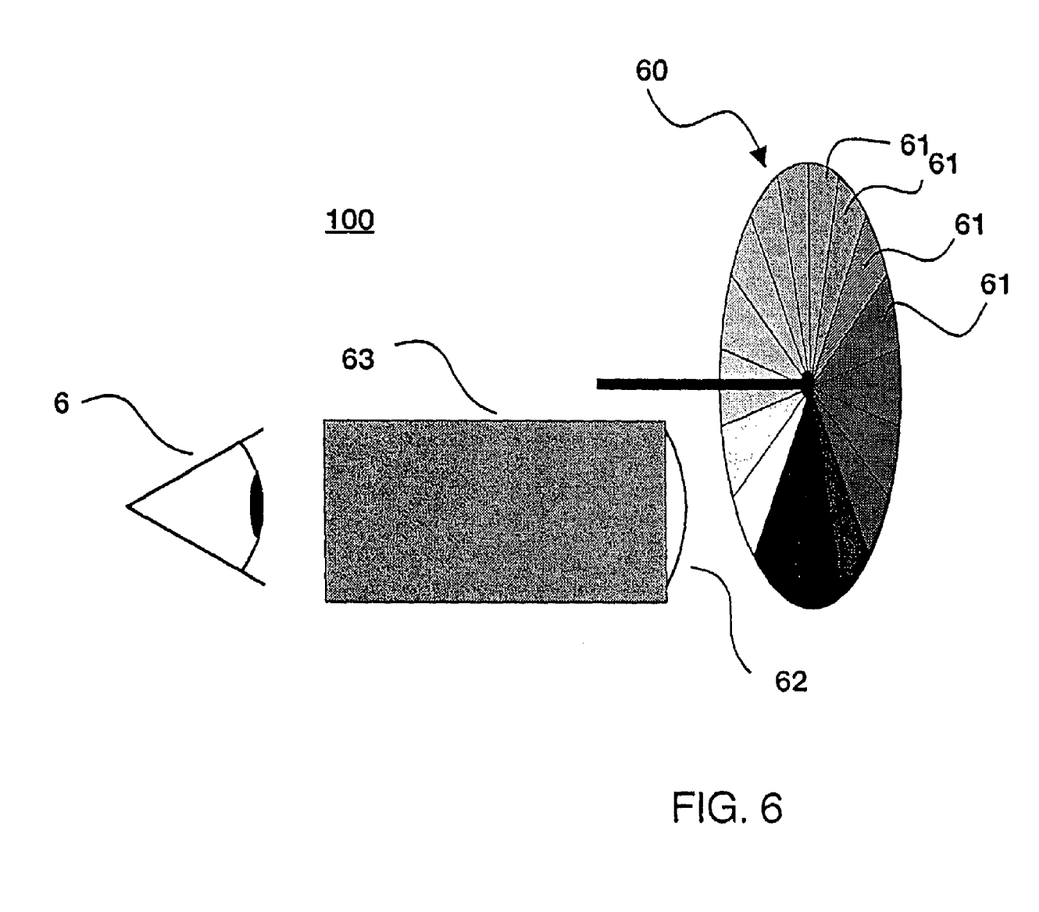
FIG. 6 is a schematic view of an apparatus for detecting an object from its background or surroundings.

Referring now to FIG. 6, there is shown a schematic view of an apparatus 100 for detecting an object 2 from its surroundings 4 or background embodying the methodology of the present invention. Although the object 2 illustrated in FIG. 6 is a vehicle this shall not be construed as a limitation, as indicated above the object to be detected includes any of a number of objects including human, animals, natural objects, and artificial or man-made items. Such an apparatus includes an electro-optical device 63 and a mechanism 60 for selectively and varyingly changing the optical input to the electro-optical device.

The electro-optical device 63 is any of a number of electro-optical devices known to those skilled in the art that are capable of sensing electromagnetic radiation in at least one of the UV spectral region, the visual spectral region or the IR (near infrared and/or far infrared). In more particular embodiments, the electro-optical device senses electromagnetic radiation in the visual spectral region and at least a portion of the UV or IR spectral region. In a more specific embodiment, the electro-optical device senses electromagnetic radiation in the visual spectral region and at least a portion of UV spectral region and IR spectral region.

In further embodiments, the electro-optical device generally includes monochromatic and color imaging devices, such as for example IR sensitive night vision devices, CCD sensors, CCD cameras, and far infrared thermal sensors. Also contemplated for use with the present invention is the color imaging device embodying a monochromatic night vision device as found in U.S. Ser. No. 09/791,416, the teachings of which are incorporated herein by reference.

Figure 7:
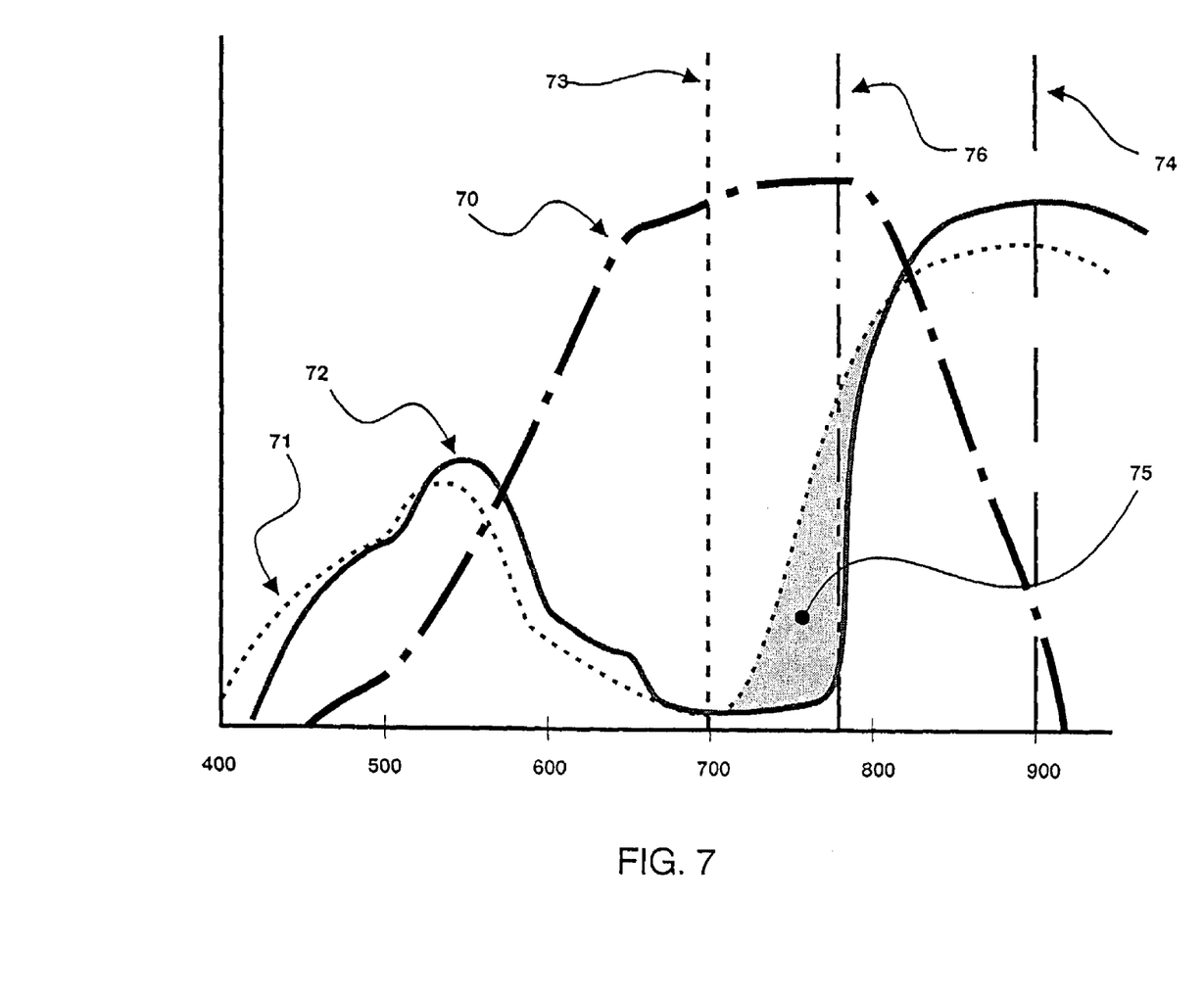
FIG. 7 is an illustration of sensitivity and reflectance curves as a function of wavelength illustrating the detection an object from its surroundings according to the present invention.

In the illustrated embodiment, the electro-optical device 63 is a color night vision device having a sensitivity curve 70 as shown in FIG. 7, and generally being capable of detecting light or electromagnetic radiation from the blue-green in the visible range to about 900 nm in the infrared. This color night vision device also is set up such that longer wavelength light such as red in the visible range and IR is displayed to the observer 6 with a red output and shorter wavelength length light is represented to the observer with a green output, the combination giving the observer the impression of a full color image.

The mechanism 60 for selectively and varyingly changing the optical input to the electro-optical device 63 comprises any one of a number of devices known to those skilled in the art, by which the optical input to the electro-optical device can be tuned such that an amount of light from outside the normal visible light range, more particularly the UV and/or IR spectral regions, in each of a plurality or more predetermined bandpasses is successively and separately added into its image-forming sensitivity. In other words, the mechanism 60 successively varies the predetermined bandpasses so the amount of light being added corresponds to different portions of the IR or UV spectral region. See the discussion that follows regarding dividing of at least a portion of the IR and/or UV spectral regions for further details as to the width and arrangement of the separate bandpasses.

In particular embodiments, the mechanism 60 for selectively and varyingly changing the optical input comprises any of a number of filters known to those skilled in the art that slowly passes longer and longer or shorter and shorter wavelength light as the filter is rotated, shifted or tilted, in the case of a reflective filter, in front of an imaging sensor of the electro-optical device 63. In more specific embodiments, the filter is located in front of the converging lens 62 or focusing optical element of the electro-optical device or between the converging lens 62 and the imaging sensor of the electro-optical device. More specifically, the filter is one of a variable low-pass, variable high-pass or bandpass filters as is known to those skilled in the art.

In the illustrated embodiment, the mechanism 60 for selectively and varyingly changing the optical input to the electro-optical device 63 comprises a variable short-wave-pass (high-pass) IR blocking filter 60 that is made up of segments 61, which are arranged radially around the filter's center. Each segment is selected such that it has a cut-off point that is at a longer wavelength than the segment preceding it counter-clockwise, more particularly, these segments have cut-off points ranging from 700 nm to 900 nm. The filter 60 is mounted so that it can be rotated in front of the lens 62 of a color night vision device 63. In an alternative embodiment, the filter segments are arranged longitudinally on a sliding filter, and the filter is slide along an axis in front of the lens 62.

In an alternative embodiment, the mechanism for selectively and varyingly change the optical input to the electro-optical device comprises a blocking filter that is made up of segments that are arranged about the filter's center. Each blocking filter segment is configured and arranged so as to block a predetermined range of wavelengths of light in one of the UV range, the visible range, the near infrared or the far infrared. More particularly, the blocking filter segments are configured and arranged so as to successively pass in front of the lens or 62 of the electro-optical device so as to successively block different ranges of wavelengths of light from being seen by the electro-optical device. In more specific embodiments, each of the blocking filter segments is configured and arranged so as to block a predetermined range of wavelengths within the sensitivity range of the electro-optical device. With the alternate embodiment, the observer 6 determines that an object 2 is present in the area being viewed when a visual difference is discerned between the object and its background while one of the blocking filter segments is disposed in front of the lens. In addition, the observer 6 determine that an object is present in the area being viewed when a visual difference is observed and when a visual difference is not observed when at least another of the blocking filter segments is located in front of the lens.

Referring now to FIG. 7 and the reflectance and sensitivity curves shown thereon, as can be seen from the reflectance curve 71 for foliage, the reflectance curve 72 for a pigment for an exemplary one modern camouflage material and the sensitivity curve 70 for the color night vision device, the color night vision device will display both foliage and the pigment as green when an IR blocking filter segment represented by line 73, that cuts off IR light at 700 nm, is positioned in front of the lens 62. Because the reflectance curves 71, 72 for foliage and pigment are both highly reflective through most of the IR range, both will appear red in the display of the color night vision device if the IR blocking filter segment represented by line 74, with a cut off at 900 nm, is in front of the lens.

As illustrated in FIG. 7, there also is a gap 75 between where the foliage starts to be reflective in the IR and where the pigment starts to be reflective in the IR. If the blocking filter segment that corresponds to line 76 and that cuts off light at 780 nm is positioned in front of the lens, then the foliage will look brown or red while the pigment in the camouflage material still looks green. This visual difference provides a mechanism by which the observer can more easily detect the presence of an object, such as a camouflaged object, because it has been visually separated from its foliage background.

Figure 8:
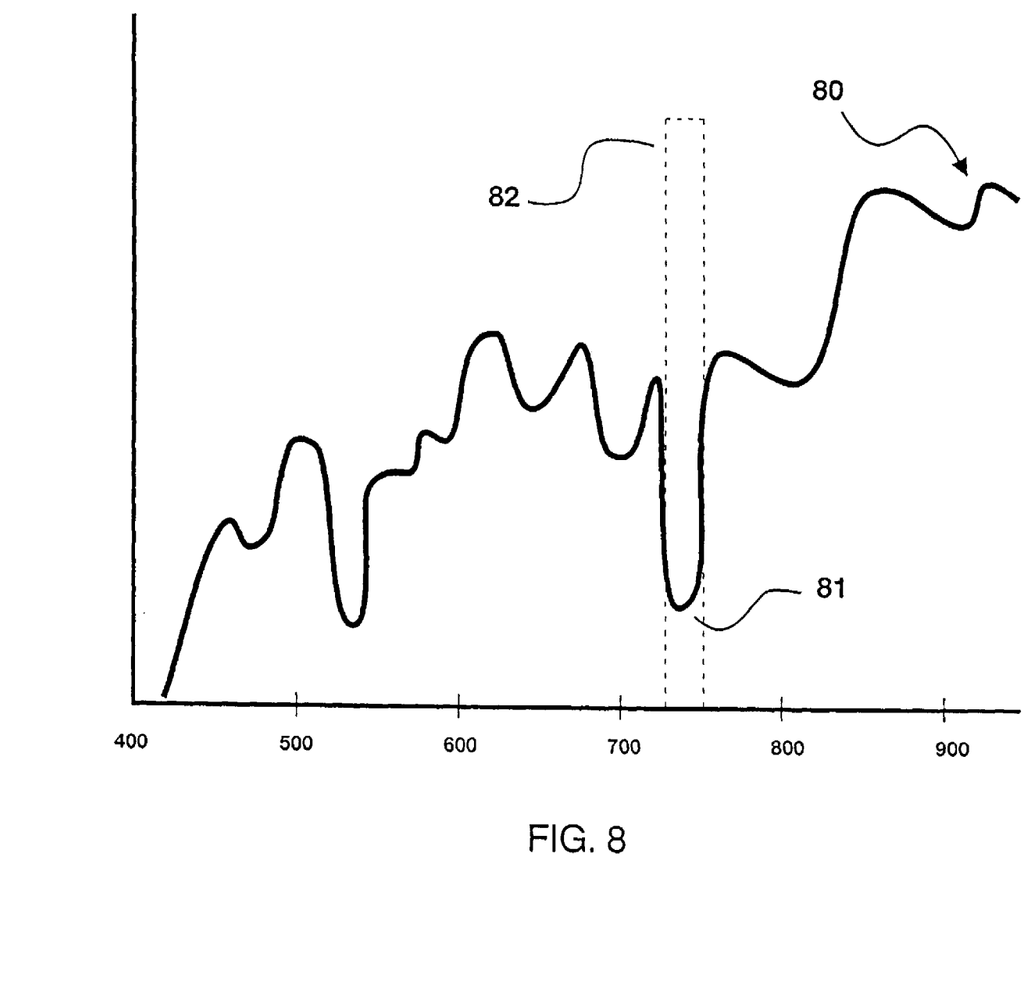
FIG. 8 is a reflectance curve as a function of wavelength of an illustrative color pigment.

As shown in FIG. 8, the reflectance curve 80 of a pigment typically is often not a smooth curve but rather is a curve often made up a sharp peaks and valleys 81, which makes it difficult to make a pigment that matches the reflectance of its natural surroundings at every point in the spectrum. For example, if IR light is added through a band-pass filter 82 that covers such a peak or valley, there may be a sharp difference in how the pigment looks in the display of the electro optical device, compared to how the natural background looks. In an embodiment of a detection apparatus according to the invention, the variable filter would be made up of filter segments each of which would pass all visible light from 400 nm to 700 nm as well as a 20 nm wide band of IR light. In each segment, the center point of the pass band would vary from the preceding segment. In other words, the center point of the following segment would be longer or shorter than preceding segment. As also described above, for the variable filters for use in apparatus of the present inventor, the filter segments can be arranged radially on a circular filter wheel or longitudinally on a sliding filter. Also, the filter can be made up of segments of different filters or be made continuously variable as is common in the art.

In another exemplary embodiment, the apparatus includes a monochromatic display electro optical device as the electro-optical device and these variable low-pass, high-pass or band pass filters. As the filters are varied, the lightness/darkness of the object to be detected, such as a camouflaged object, may vary from that of its background and thus be revealed.

In yet another embodiment of a device made in accordance with the technology, an electro-optical device that is sensitive in the UV as well as the visible range has a variable filter mounted in front of it. The variable filter is a variable longwave pass filter that passes light less than 400 nm, or a variable band-pass filter passing light in bands with wavelengths less than 400 nm and light with a wavelengths in the range of from 400 nm to 770 nm.

In still yet another embodiment, two different variable filters are mounted in front of an electro-optical device 63 with a wide range of sensitivity, from UV to IR. One of the variable filters is configured to pass visible light plus a variable cut off point of IR light, and the other variable filter passes visible light plus a variable cut off point of UV light. This mixture of input of UV, IR and visible makes it even more difficult for a camouflage material to always match its background.

In yet a further embodiment, there are two different variable filters mounted in front of an electro-optical device 63 with a wide range of sensitivity, from UV to IR. One filter passes visible light plus a variable pass band IR light, and the other variable filter passes visible light plus a variable pass band of UV light. This mixture of input of UV, IR and visible makes it more difficult for a camouflage material to always match its background.

The detection device 100 of the present invention may be operated in an environment where the electro-optical device 63 is exposed to threats from offensive lasers or hazard lasers such as laser rangefinders or designators. Thus, and according to another aspect of the present invention, the detection device 100 can further comprise a mechanism that blocks light or electromagnetic radiation from such offensive or hazard lasers. More particularly, a segment is provided in the filter that is configured with blocking bands that will protect the electro-optical device from laser light. In a further embodiment, the variable filter with the blocking bands is moved so that the segment with the protective blocking filter is in front of the lens 63 when the observer is alerted to the threat or risk of laser light.

It also is within the scope of the present invention, to sequentially input image data of the area being viewed by the electro-optical device into a computer and to provide a program for execution within the computer, which program includes instructions and criteria for analyzing and monitoring the sequentially inputted image data to determine if the image observed at one interval is different from the image data in a subsequent interval. The execution program preferably also includes instruction and criteria to assess the difference and to determine if the difference represents a substantive change to the area being observed, suggestive that an object or other structure or features of the image has been added to or deleted from the previous image data.

In more particular embodiments, the execution program further includes instructions and criteria to provide an output when a determination is made that there is a substantive change from the prior image data, notifying an observer of the change to the image data. In a specific embodiment, the output also includes information that allows the observer to localize the change within the area being viewed. In another specific embodiment, the output is used to modify the viewed image of the electro-optical device so as to provide an identifying indicator that identifies that portion of the image being viewed that is determined to have substantively changed from the prior image data.

Although a preferred embodiment of the invention has been described using specific terms, such description is for illustrative purposes only, and it is to be understood that changes and variations may be made without departing from the spirit or scope of the following claims.

What is claimed is:

1. A method for detecting an object from its background or surroundings comprising the steps of:
    viewing an area with a viewing device comprising a first filter and a second filter, while with the first filter selectively and varyingly changing the sensitivity of the viewing device to certain wavelengths of light (electromagnetic radiation) lying in the ultraviolet (UV) range such that the first filter passes visible light plus a variable bandpass of UV light, and with the second filter selectively and varyingly changing the sensitivity of the viewing device to certain wavelengths of light (electromagnetic radiation) lying in the infrared (IR) range such that the second filter passes visible light plus a variable bandpass of IR light; and
    determining the presence of an object when a visual difference between the object and background is discerned when the sensitivity of the viewing device is changed to pass a certain mixture of input of UV, IR and visible light, wherein the visual difference between the object and background is a difference in color or tonality.

2. The method of claim 1, wherein said determining includes determining the presence of an object when a visual difference is observed between the object and the background and when no discernable visual difference is observed when the sensitivity of the viewing device is changed to at least another mixture of wavelengths of light.

3. The method of claim 1 or 2 wherein at least a portion of the UV range is divided into a plurality of viewing bandpasses in said first filter, and wherein at least a portion of the IR range is divided into a plurality of viewing bandpasses in said second filter.

4. The method of claim 3 wherein the first filter comprises the spectral range of the UV range divided into one or more viewing bandpasses and the second filter comprises the spectral range of the IR range divided into one or more viewing bandpasses.

5. The method of claim 4 wherein each viewing bandpass has a width that is narrow enough so as to minimize contributions from other areas of the spectral region that would tend to mask the visual difference between the object and the background and wide enough to pass enough light/energy so as to make a difference in a display of a viewing device.

6. The method of claim 4 wherein said viewing bandpasses are configured such that the bandwidth of adjacent viewing bandpasses partially overlap.

7. The method of claim 3 wherein each viewing bandpass has a width that is narrow enough so as to minimize contributions from other areas of the spectral region that would tend to mask the visual difference between the object and the background and wide enough to pass enough light/energy so as to make a difference in a display of a viewing device.

8. The method of claim 3, wherein said viewing bandpasses are configured such that the bandwidth of adjacent viewing bandpasses partially overlap.

9. The method of claim 1 wherein each viewing bandpass has a bandwidth of about 100 nm or less.

10. The method of claim 1 wherein each viewing bandpass has a bandwidth of about 50 nm or less.

11. An apparatus for detecting an object from its background or surroundings comprising:
    an electro-optical viewing device capable of detecting light in one of the ultraviolet (UV) range, the visible range, the near infrared or the far infrared; and
    a mechanism, disposed between the object and the electro-optical viewing device, the mechanism comprising a first filter and a second filter, the first filter comprising at least a portion of the ultraviolet (UV) range divided into a plurality of viewing bandpasses, the second filter comprising at least a portion of the infrared (IR) range divided into a plurality of viewing bandpasses, the first filter being configured to pass visible light plus a variable bandpass of UV light and the second filter being configured to pass visible light plus a variable bandpass of IR light, the mechanism configured and arranged to selectively and varyingly change the bandpass of UV light and the bandpass of IR light, wherein as the bandpass of UV light and bandpass of IR light to the device are varied, the device provides a visual difference between the color or tonality of the object and the background.

12. The apparatus of claim 11, wherein
the filter comprises a plurality of filter segments, the filter segments being configured and arranged so each view a different bandwidth of the ultraviolet (UV) range and the infrared (IR) range; and wherein the mechanism further comprises means for one of selectively rotating, shifting or tilting the filter so as to successively position each filter segment at a light input end of the electro-optical viewing device.

13. The apparatus of claim 11 or 12, wherein the electro-optical viewing device is one of a monochromatic image viewing device or a color image viewing device.

14. The apparatus of claim 11 or 12 wherein the electro-optical viewing device is a color image viewing device and the an amount of light in each of the viewing bandpasses is successively and separately added into the image forming sensitivity of the color image viewing device.

15. The apparatus of claim 11 wherein each bandpass has a bandwidth of about 100 nm or less.

16. The apparatus of claim 11 wherein each bandpass has a bandwidth of about 50 nm or less.

* * * * *